(12) United States Patent
Pozzi et al.

(10) Patent No.: US 7,833,416 B1
(45) Date of Patent: Nov. 16, 2010

(54) METHOD FOR REMOVING HYDROCARBONS FROM THE BED OF A BODY OF WATER

(75) Inventors: Nicholas John Pozzi, 18814 Emery Meadows La., Tomball, TX (US) 77377; Jon Eliot King, Houston, TX (US)

(73) Assignee: Nicholas John Pozzi, Tomball, TX (US)

( * ) Notice: Subject to any disclaimer, the term of this patent is extended or adjusted under 35 U.S.C. 154(b) by 0 days.

(21) Appl. No.: 12/833,700

(22) Filed: Jul. 9, 2010

(51) Int. Cl.
*C02F 3/00* (2006.01)

(52) U.S. Cl. .................. 210/608; 210/620; 210/629; 210/631; 210/923

(58) Field of Classification Search ............... 210/608, 210/620, 629, 631, 242.1, 242.2, 242.3, 242.4, 210/923
See application file for complete search history.

(56) References Cited

U.S. PATENT DOCUMENTS 7,528,097 B2 * 5/2009 Hanson et al. ............. 508/491

2006/0201867 A1 * 9/2006 Zori Garcia ............. 210/242.3

* cited by examiner

*Primary Examiner*—Chester T Barry
(74) *Attorney, Agent, or Firm*—Buskop Law Group, PC; Wendy Buskop

(57) ABSTRACT

A method for removing hydrocarbons from a body of water using an agitating, sucking, microbe and expelling boom is described herein. The method can include attaching the boom to a vessel and disposing the boom in the water. The method can include flowing air into a tubular of the boom to agitate material on the bed. A vacuum pressure can be provided to another tubular of the boom to flow the material to a separator. The separator can separate the hydrocarbons from the material. The method can include flowing microbes and air proximate the bed to remove hydrocarbons and to provide oxygen. The method can include attaching hoses to each tubular and to a distribution manifold, forming an ASME conduit. The ASME conduit can be sunk to the bed while the boom floats at a surface of the body of water.

20 Claims, 6 Drawing Sheets

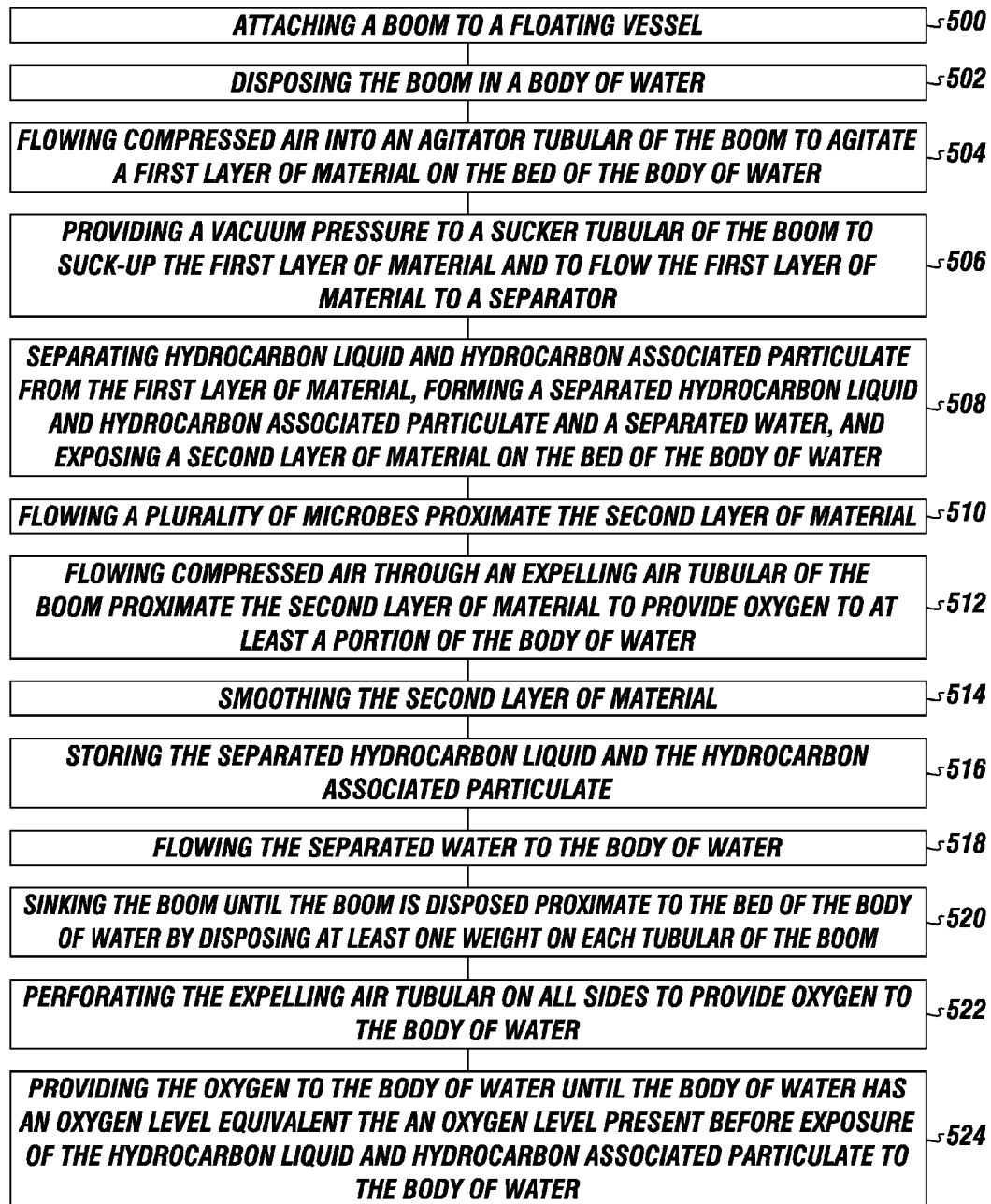

“METHOD FOR REMOVING HYDROCARBONS FROM THE BED OF A BODY OF WATER

FIELD

The present embodiments generally relate to a method of removing hydrocarbons from a body of water using a small floating vessel with a boom. The boom can agitate a sea bed, remove hydrocarbon particulate, insert hydrocarbon consuming microbes and aerate the surrounding water.

BACKGROUND

A need exists for a simple method that can be attached or retrofitted for an existing boat using off-the-shelf equipment.

A need exists for a quick clean up of oil spills, such as those in the Gulf of Mexico.

The present embodiments meet these needs.

BRIEF DESCRIPTION OF THE FIGURES

FIG. 5A depicts an embodiment of a method for removing hydrocarbons from a body of water.

Figure 1:
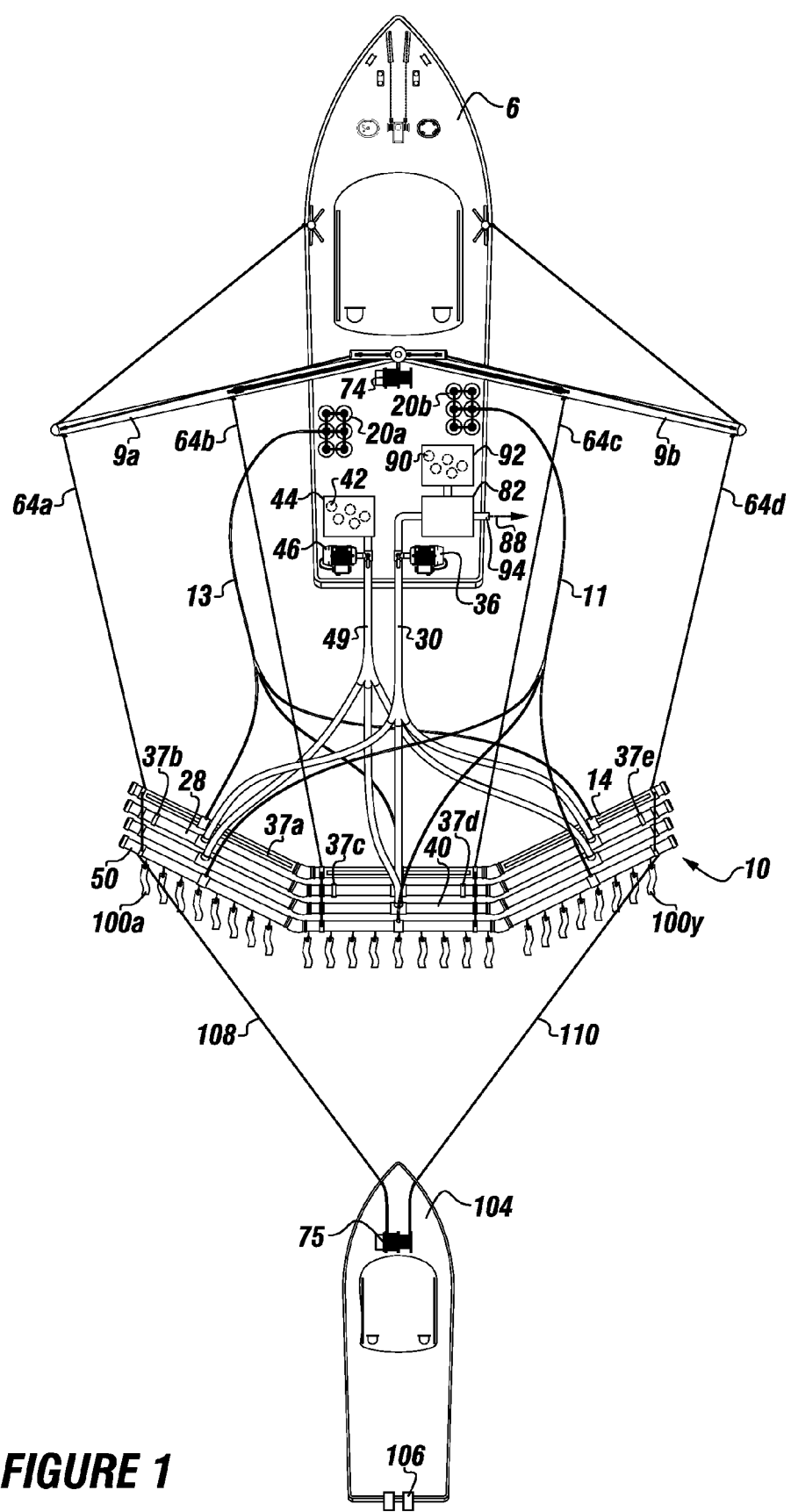
FIG. 1 depicts an embodiment of a system that can be used to implement the method.

The present embodiments are detailed below with reference to the listed Figures.

DETAILED DESCRIPTION OF THE EMBODIMENTS

Before explaining the present method in detail, it is to be understood that the method is not limited to the particular embodiments and that the method can be practiced or carried out in various ways.

The method can be used to save marine life and the environment by quickly cleaning up an oil spill, including toxic tar balls, oil plumes and oil droplets. The method can be used to clean up oil spills at water depths from about one foot to about three hundred feet. For example, in April of 2010, an oil rig exploded in the Gulf of Mexico spilling at least 5000 barrels of oil a day. Embodiments of the method can be used to quickly and efficiently clean up such oil spills. The method can be used to clean oceans, ponds, lakes, rivers, coves, estuaries, marshes, The Everglades, or other bodies of water.

One or more embodiments of the method can include quickly installing the boom onto a boat, such as a shrimp boat, a work boat, a bass boat, an airboat, a barge, a self-propelled barge, a shallow draft houseboat, a swing keel sailboat, a tugboat, a patrol boat, or another type of floating vessel. The method can save money by not requiring a newly or specially constructed boat to clean up the oil spill.

The boom can be an agitating, sucking, microbe and expelling boom. The boom can be usable with a floating vessel with a hull. The hull can have an overall hull length of up to one hundred feet, and a draft of less than eight feet. In embodiments, the floating vessel can have a keel.

The floating vessel can have at least one movable pole on both the starboard side and the port side. The movable poles can be attached to the hull in a moveable manner, a pivotable manner, or combinations thereof. The moveable poles can be telescoping poles. The moveable poles can be mounted to the hull such that each movable pole extends from the floating vessel.

The method can include securing the agitating, sucking, microbe and expelling boom to the moveable poles with guidelines. A first guideline can extend from a portion of the boom to a first moveable pole on the starboard side. A second guideline can extend from a portion of the boom to a second moveable pole mounted to the port side of the vessel.

During operation, the movable poles can move or pivot, which allows the boom to move or pivot behind the floating vessel. The movable poles can move or pivot from an angle from about one degree to about one hundred twenty degrees to the keel of the floating vessel. The movable poles can be poles that were originally installed on the floating vessels, such as the "outriggers' of a shrimp boat to allow the floating vessel to be more quickly and easily retrofitted. The movable poles can move aft to bow, as well as above and below the water line of the floating vessel. In one or more embodiments, the movable poles can pivot up to three hundred sixty (360) degrees. The movable poles can be hinged to the floating vessel, the boom, or combinations thereof.

The movable poles can be attached to the boom with guidelines. The guidelines can be attached to one or more winches that can be disposed on the floating vessel. The guidelines can have a diameter ranging from about one-eighth of an inch to about three inches. The guidelines can be formed from a woven or twisted wire rope, a cable, a rope, a chain, an elastomeric rope like-material, a high tension fishing line, nylon, hemp rope, polymeric material, another material, or combinations thereof. In one or more embodiments, the guidelines can be very thin, such as less than three mm in diameter.

Each guideline can be secured to a winch that can be disposed on the floating vessel. Each winch can be manually operated or electrically operated. In one or more embodiments, a first winch on the first floating vessel can be used to release the guideline, while a second winch on another floating vessel connected to the boom can be used to tug the boom.

The agitating sucking microbe and expelling boom can include four tubulars. The four tubulars can include an agitator tubular, a sucker tubular, a microbe tubular, and an expelling air tubular. The tubulars can be parallel and/or connected tubulars.

The agitator tubular can have a plurality of agitator openings. Each agitator opening can have a diameter from about one-eighth of an inch to about three-fourths of an inch. The agitator openings can be spaced apart from each other in an even and equidistant manner, in a helical spiral, or in a random pattern along the agitator tubular. The agitator openings can be positioned in rows that can be sequentially spaced from about one inch to about three inches apart from each other.

The agitator tubular can have an agitator inlet that can have a diameter from about two inches to about four inches. The agitator tubular can be in fluid communication with a compressed air source. The agitator inlet can receive compressed air from the compressed air source disposed on the floating vessel. The agitator inlet can be centrally disposed at an end of the agitator tubular. In one or more embodiments, the agitator tubular can have a plurality of agitator inlets disposed along the length of the agitator tubular. The agitator tubular can be a telescoping agitator tubular with at least two sections.

The method can include transferring compressed air from the compressed air source to at least one agitator inlet. The pressure of the compressed air can be adjusted depending upon the parts per million of hydrocarbon within the body of water.

A hose or tube can provide fluid communication between the compressed air source and the agitator inlet. The hose can be a flexible hose, and can be clamped to each agitator inlet, such as with a hose clamp or another fastener.

The compressed air source can be a Cummings™ electric compressor that generates compressed air from about one psi to about one hundred fifty psi. The compressed air source can be one or more compressed air tanks or a compressor connected to a power source, such as a generator. The compressed air source can be charged on-shore, such as at a dive shop. The compressed air source can be an air compressor located on the floating vessel. The compressed air source can allow for continuous flowing of compressed air into the agitator tubular.

In one or more embodiments, the compressed air can flow at a rate from about one foot per second to about ten feet per second. The compressed air can flow into the agitator tubular and through the plurality of agitator openings, which agitates a first layer of material on the bed of a body of water. The first layer of material can be a sand, a particulate, a mud, a plant matter, a debris, a tar ball, an oil, an oil sheen, an oil plume, an oil globule, a copper tailing, a rock, an organic matter, or combinations thereof.

The agitating sucking microbe and expelling boom can have a second tubular that can be connected to the agitator tubular. The second tubular can be the sucker tubular. The sucker tubular can have a plurality of sucker openings that can be similar in size and orientation to the agitator openings.

The sucker tubular can have one or more sucker inlets, which can be similar to the agitator inlets. Each sucker inlet can have a diameter that can vary from about two inches to about four inches.

The method can include providing fluid communication between a vacuum pump and the sucker tubular. The vacuum pump can be disposed on the floating vessel. The method can include providing a vacuum pressure to each sucker inlet, such as by using the vacuum pump; thereby forming a vacuum suction at the sucker openings. The method can include using the vacuum suction to suck up material from the bed of the body of water, such as the first layer of material that has been agitated by the agitator tubular. The vacuum pressure within the sucker tubular can range from about twenty to about three hundred mmHg. The vacuum pressure can be adjusted depending upon the parts per million of hydrocarbon within the body of water.

The sucked up material can be transferred from the sucker tubular, through a hose or tube in fluid communication with the sucker tubular, and to a separator in fluid communication with the sucker tubular. The separator can be on a second or third floating vessel. Two or more separators can be used. The separator can be a mechanical type separator, which can separate the oil and dispersants from the water.

An example of a separator that can be used in one or more embodiments of the method is one made by Hydrasep, LLC of Fernando, Miss., which can remove the hydrocarbon liquid and hydrocarbon associated particulate from the sucked up first layer of material, which forms the separated water. The separator can be a non-moving mechanical separator. Various sizes of separators can be used. In one or more embodiments, the method can include multiple separators that can be in fluid communication with the sucker tubular in a parallel or series arrangement.

The separated water can be discharged back into the body of water safely. A water conduit in fluid communication with the separator can provide a flow path for the separated water to be discharged to the body of water. The water conduit can be made from a flexible hose, a plastic hose, a rubber hose, or combinations thereof. The water conduit can have a diameter ranging from about one inch to about six inches or larger depending on the capacity of the separator(s).

A flexible hose can be used to connect the sucker tubular to the separator. The flexible hose can be secured to the sucker tubular with an adhesive, an epoxy, a hose clamp, or another connection means. The hose clamp can ensure that forces exerted onto the flexible hose, such as from rocks and shells that flow through the flexible hose, do not disconnect the flexible hose from the sucker tubular.

In operation, after the first layer of material has been agitated by the agitator tubular, the sucker tubular can be used to suck the first layer of material through the plurality of sucker openings. In one or more embodiments, the sucker tubular can suck up the material at a rate of flow from about two gallons per minute to about three million gallons per minute. The sucker tubular can expose a second layer of material on the bed of the body of water.

The separator can be in fluid communication with a storage tank on the floating vessel, also referred to as an onboard storage tank. The separator, the storage tank, and/or the sucker tubular can be connected to a remote storage tank or a second storage tank on the floating vessel. The remote storage tank or the second storage tank can receive the sucked up material, such as when the first storage tank on the first floating vessel is full. The remote storage tank can be a second floating vessel or a land based storage tank. The second floating vessel can be an oil tanker or an old battleship. The battleship can have the cabins removed and can be filled up one-third full with oil, while staying stable and floating. The second floating vessel can be one such as the ABQAIQ owned by a Saudi Arabian oil company.

The storage tank can be an industrial storage tank and can have a sight glass that can indicate to an operator when the storage tank is full. When the storage tank is full, the operator can connect the storage tank to the remote storage tank or to the second storage tank. The remote storage tank and the second storage tank can be in fluid communication with the storage tank on the vessel through a pipe.

In one or more embodiments, the storage tank on the vessel can have a floating indicator that can have a visual target that rises when the tank fills up, which enables an operator to cease operation when the operator can view the visual target and to connect the separator to the remote storage tank or to the second storage tank. The storage tank, also referred to herein as "a hydrocarbon storage tank", can be a small vessel.

The hydrocarbon storage tank can receive the hydrocarbon liquid and hydrocarbon associated particulate from the separator. The storage tank can be a single or double walled metal tank or a plastic container with a sealable lid. The storage tank can have a capacity ranging from about two hundred barrels to about three million five hundred thousand barrels.

A third tubular can be connected to the sucker tubular. The third tubular can be the microbe tubular. The microbe tubular can have a plurality of microbe openings that can be formed substantially similar to the agitator openings and the sucker openings. The microbe tubular can have the same diameter as the agitator tubular and the sucker tubular. The microbe tubular can be in fluid communication with a microbe reservoir and a microbe pump.

The microbe tubular can have at least one microbe inlet formed thereon for receiving microbes, such as Enviroclean™ microbes made by Integra™ of Houston, Tex. The microbes can flow from the microbe reservoir into the microbe tubular, or the microbes can be pumped from the microbe reservoir into the microbe tubular. The microbe tubular can flow or pump the microbes into the second layer of material. The flow rate of the microbes flowing from the microbe tubular can be varied depending upon the toxic material density, such as the amount of oil, tar balls, toxic materials or other hydrocarbons that are within the second layer of material. The flow rate of the microbes flowing from the microbe tubular can also be varied depending upon the type of particulate that the second layer of material includes. For example, if the second layer of material is mostly sand, the rate of flow can be adjusted to be higher than if the second layer of material were mostly shale.

The microbe reservoir can be disposed on the floating vessel. The microbe reservoir can be a microbe tote or a portable sealable plastic container. The microbe reservoir can be capable of containing from about one hundred to about two hundred seventy four gallons of microbes.

The microbes can be microbes that eat or consume oil, copper, hydrocarbons, toxins, or other materials. The microbes can be in a dormant state until they are exposed to heat, to hydrocarbons, or other environmental factors. The microbes can attach to the hydrocarbon liquid and/or hydrocarbon associated particulate and rise to the surface of the body of water, which remove the hydrocarbons from the bed of the body of water.

The microbes can flow through the microbe openings and into the second layer of material on the bed of the body of water. The pressure and flow rate of the microbes into the body of water can be adjusted depending upon the parts per million of hydrocarbon within the water. The microbes can flow continuously and the agitator tubular and the sucker tubular continue to operate, which allows for simultaneous, large capacity clean up of the first layer of material and the second layer of the material.

The boom can include a fourth tubular that can be the expelling tubular, or an expelling air tubular. The expelling air tubular can have a plurality of expelling air openings and at least one expelling air inlet. The expelling air inlet can be in fluid communication with a compressed air source and can receive compressed air from the compressed air source. The compressed air can pass into the expelling air tubular and out of the expelling air openings. The pressure of the compressed air flowing from the expelling air tubular can be adjusted depending upon the parts per million of hydrocarbon within the water.

In one or more embodiments, the expelling air tubular can have a separate compressor that can be located on the floating vessel or on a second floating vessel rafted up to the first floating vessel.

The compressed air can flowing through the expelling air openings, and can agitate the second layer of material to a depth of at least one-half an inch and up to a depth of three inches. The agitation caused by the expelling air tubular can form turbulence in the water proximate the bed of the body of water, which aerates the water near the expelling air tubular and helps sea plants and vegetation to grow. The expelling air tubular can provide oxygen to a portion of the body of water until the body of water has an oxygen level equivalent to an oxygen level present before exposure of the hydrocarbon liquid and hydrocarbon associated particulate to the body of water.

In one or more embodiments, the expelling air tubular can be perforated on all sides to provide oxygen to the surrounding body of water. The perforations can be equidistantly positioned at one-fourth inch intervals. The perforations can be grouped together in patterns. A larger number of perforations can be disposed near the bed of the body of water. The expelling tubular can be a curvilinear shape, such as a pretzel-like shape.

In one or more embodiments, the agitator tubular can be disposed adjacent the sucker tubular; the sucker tubular can be disposed adjacent the microbe tubular; the microbe tubular can be disposed adjacent the expelling air tubular. This embodiment can form the agitating, sucking, microbe and expelling boom.

The boom can be a square shape, a multiple nested circle, a polygonal shape, or another shape or formation.

In one or more embodiments, each tubular can have at least one nozzle in at least one of the plurality of openings. The nozzle can be used to change the rate of flow from or into the tubulars. The nozzles can be made from metal or plastic, such as those made for an irrigation drip line. The nozzles can be threaded to an opening and adhesively attached to the tubulars, attached with clips or similar fasteners to the tubulars, or otherwise attached to the tubular or to the openings of the tubular. The nozzles can be removable, providing for ease of repair and replacement. The nozzles can be adjustable, allowing a user to change a diameter of the nozzle for modifying a flow rate.

Each tubular can be made of the same material, such as a flexible durable high impact strength hose, or the tubulars can be made from different materials. In an embodiment, the tubular can be a pipe.

For example, the agitator tubular can be made from a rigid plastic; the microbe tubular can be made from a non-rusting, catholic protected metal alloy; and the expelling tubular can be made from combinations of these materials. Each tubular can have an inner diameter ranging from about one inch to about twenty inches, a wall thickness ranging from about one-eight to about one half an inch, and a length from about four feet to about forty feet. Each tubular can be the same size or a different size from the other tubulars. The tubulars can be telescoping, allowing for easy transport of the tubulars.

The openings on each of the tubulars can vary in diameter or can be the same diameter. The openings can be formed in rows disposed equidistantly along at least one half of an outer surface of each tubular. Each tubular can include from about one to about ten rows of openings. The openings can be formed randomly along the tubular or in a pattern, such as a helical pattern.

The method can include disposed at least one weight on one or more of the tubulars. The weights can provide the boom with a weight necessary for sinking towards the bed of the body of water. Each weight can be a one (1) inch wide strip of lead that can be wrapped around at least one tubular, a bar attached to at least one tubular, or a collar disposed about at least one tubular. Each tubular can include two weights disposed on each end of the tubular and one weight disposed at the center of the tubular. The weight can be a bag of rocks attached to the tubular that can extend along the length of the tubular. The weight can be adapted to sink each tubular to an area proximate the bed of the body of water.

One or more embodiments relate to a boom without a weight disposed thereon, such that the boom can float on a surface of the water for the removal of hydrocarbon liquid and hydrocarbon associated particulate from the surface of the body of water.

One or more embodiments can include tubular separators, such as turnbuckles or connected paired collars, that can connect the agitator tubular to the sucker tubular, the sucker tubular to the microbe tubular, and the microbe tubular to the expelling air tubular. Each tubular separator can be a pipe that allows water to flow through the tubular separator, which adds weight to the boom and keeps the boom proximate the bed of the body of water. Each tubular separator can be a four inch pipe that can be lashed to the boom using a rope, a tie wrap, a cable or another device. The tubular separators can be rotatable turnbuckles that can allow the boom to assume other shapes.

The floating vessel can have a propulsion system for self steering. The propulsion system can have a propeller connected to a motor with a fuel tank that can be operable by a steering station.

In one or more embodiments, an additional structure with an additional structure winch can be attached to the boom. The winch of the additional structure can be connected to the agitating, sucking, microbe and expelling boom with at least two additional guidelines. The additional structure can be used to assist in movement and placement of the agitating, sucking, microbe and expelling boom on the bed of the body of water. The additional structure can be an additional floating vessel, a static structure on a shore of the body of water, a vehicle on the shore of the body of water, a truck, a land based structure, another device capable of having a winch attached to it, or combinations thereof.

In operation, the floating vessel can be non-moving within the body of water, such as anchored at a particular location. The floating vessel can be attached to the boom with one or more winches and guidelines. The additional structure can also be attached to the boom with one or more winches and guidelines. The one or more winches on the additional structure can be used to pull the guidelines to move the boom from being disposed proximate the floating vessel to being disposed proximate the additional structure or to being disposed proximate the shore of the body of water.

During the movement of the boom from being disposed proximate the floating vessel towards the shore or the additional structure, the boom can remove hydrocarbon liquid and hydrocarbon associated particulates from the body of water. The one or more winches on the floating vessel can be used to pull the guidelines to move the boom from being disposed proximate the additional structure or the shore to being disposed proximate the floating vessel. During the movement of the boom from being disposed proximate the additional structure or the shore towards the floating vessel, the boom can remove hydrocarbon liquid and hydrocarbon associated particulates from the body of water.

In one or more embodiments, a plurality of floating vessels with the booms as described herein can be simultaneously used to clean a large portion of a shore line or a body of water. The plurality of floating vessels can be disposed at various distances from the shore, such that the plurality of floating vessels is staggered with respect to the shore line. This ensures less interference between each floating vessel.

In one or more embodiments, a rigid structure, such as a pipe or a pole, can be attached to adjacent floating vessels of the plurality of floating vessels to ensure the floating vessels remain disposed a safe distance from each other. The safe distance can be at least greater than the length of a boom.

In one or more embodiments, each tubular can include a flexible hose in fluid communication therewith. Each flexible hose can be connected to a distribution manifold to form an ASME conduit and allow for treatment of a smaller portion of the body of water.

One or more embodiments can include a plurality of sand smoothers connected to at least one of the tubulars, such as the expelling air tubular. The sand smoother can be a leather strip, a rubber hose, or a rope. The sand smoothers can be positioned at one inch intervals, three inch intervals, or other intervals along the tubular.

One or more embodiments can include a power source that can be a pneumatic power source, a hydraulic power source, a diesel electric power source, an electric power source, a solar power source, a wind based power source, or combinations thereof. The power source can power all of the equipment that requires power.

Turning now to the figures, FIG. 1 shows a floating vessel 6 with a pair of movable poles 9a and 9b. The movable poles 9a and 9b can move into the water, out of the water, towards the bow of the vessel, and towards the stern of the vessel.

An agitating, sucking, microbe and expelling boom 10 can be attached to the floating vessel 6 with guidelines 64a, 64b, 64c and 64d. The agitating, sucking, microbe and expelling boom 10 can include an agitator tubular 14, a sucker tubular 28, a microbe tubular 40 and an expelling air tubular 50. A winch 74 can be connected to the guidelines 64a, 64b, 64c and 64d for moving the agitating, sucking, microbe and expelling boom 10 towards the floating vessel 6, or for allowing the agitating, sucking, microbe and expelling boom 10 to move towards an additional structure 104, here shown as an additional floating vessel.

The additional structure 104 can be attached to the agitating, sucking, microbe and expelling boom 10 with an additional structure first guideline 108 and an additional structure second guideline 110 for assisting in positioning of the agitating, sucking, microbe and expelling boom 10. The additional structure first guideline 108 and the additional structure second guideline 110 can attach to the additional structure 104 with an additional structure winch 75.

The additional structure 104 can have a propulsion system 106, which can be an outboard motor or a removable thruster. The additional structure winch 75 can be used to move the agitating, sucking, microbe and expelling boom 10 towards the additional structure 104, or to allow the agitating, sucking, microbe and expelling boom 10 to move towards the floating vessel 6.

In one or more embodiments, the floating vessel 6 and the additional structure 104 can remain stationary and can move the agitating, sucking, microbe and expelling boom 10 by winching. In one or more embodiments, the floating vessel 6 and/or the additional structure 104 can move and drag the agitating, sucking, microbe and expelling boom.

The agitator tubular 14 can receive compressed air from a compressed air source 20a through an agitator hose 13.

The expelling tubular 50 can also receive compressed air from a secondary compressed air source 20b through an expelling hose 11.

The sucker tubular 28 can receive a vacuum pressure from a vacuum pump 36 through a vacuum conduit 30. The vacuum conduit 30 can flow the sucked up first layer of material to a separator 82. Separated hydrocarbon liquid and hydrocarbon associated particulate 90 can be passed from the separator 82 to a hydrocarbon storage 92 for containment. The separator 82 can flow separated water 88 through a water conduit 94 and back into the body of water.

Microbes 42 can be pumped from a microbe reservoir 44 through a microbe hose 49 to the microbe tubular 40 using a microbe pump 46.

Smoothers 100a and 100y can be connected to the expelling tubular 50 for smoothing the second layer of material containing the microbes.

The agitating, sucking, microbe and expelling boom 10 can have various weights. A weight 37a, shown as a long bar of metal, can be disposed on the agitator tubular 14. Weights 37b, 37c, 37d, and 37e, shown as collars, can be disposed about the sucker tubular 28.

Figure 2:
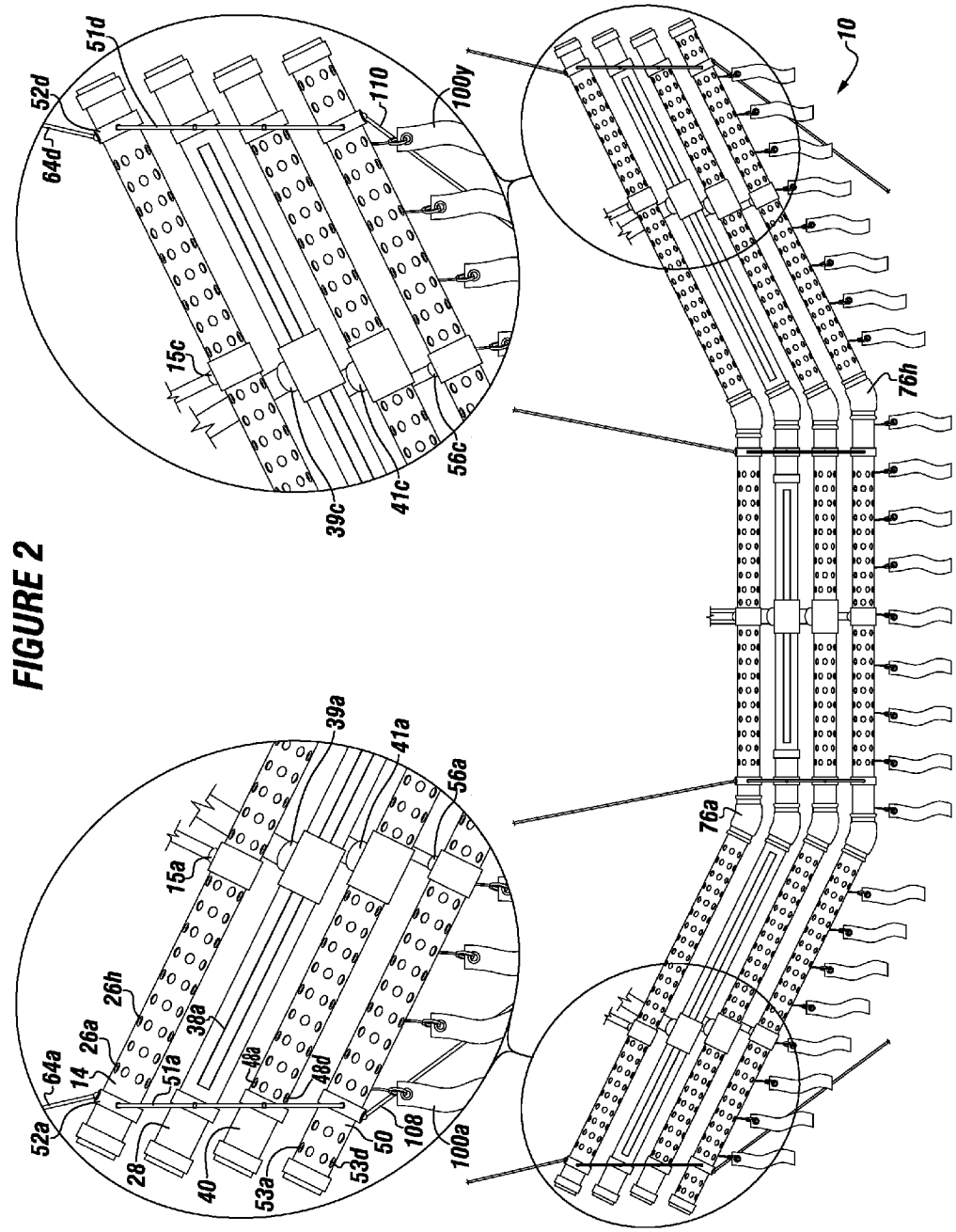
FIG. 2 depicts a detail of a boom that can be used to implement the method.

FIG. 2 depicts a detail of the agitating, sucking, microbe and expelling boom 10 with tubular separators pipes 51a and 51d for connecting the various tubulars of the agitating, sucking, microbe and expelling boom 10 together. The tubular separator pipe 51a is shown connected to a tubular separator collar 52a. The tubular separator collar 52a can provide engagement between the tubular separators pipe 51a and the agitator tubular 14. The tubular separator collar 52d can provide engagement between the tubular separators pipe 51d and the agitator tubular 14.

The agitator tubular 14 can have a plurality of openings 26a and 26h that can be in fluid communication with agitator inlets 15a and 15c.

The sucker tubular 28 can have a plurality of sucker openings, including sucker opening 38a. The sucker tubular can suck-up material through the sucker opening 38a, through the sucker inlets 39a and 39c, to a separator.

The microbe tubular 40 can have microbe inlets 41a and 41c in fluid communication with a plurality of microbe openings, including microbe openings 48a and 48d.

The expelling air tubular 50 can have a plurality of expelling air openings, including expelling air openings 53a and 53d, which can be in fluid communication with expelling air inlets 56a and 56c.

In one or more embodiments, each tubular can include an inlet disposed every four feet.

The agitating, sucking, microbe and expelling boom 10 can include a plurality of flexible joints, including flexible joints 76a and 76h. The flexible joints can allow the tubulars to flex in the currents and absorb forces without breaking. In one or more embodiments, each tubular can have a first tubular portion and a second tubular portion. The first tubular portion can be connected to the second tubular portion with flexible joints. In one or more embodiments, each tubular can include a flexible joint disposed every eight feet.

The additional structure first guideline 108, additional structure second guideline 110, smoother 100a, smoother 100y, guideline 64a, and guideline 64d are also depicted.

Figure 3:
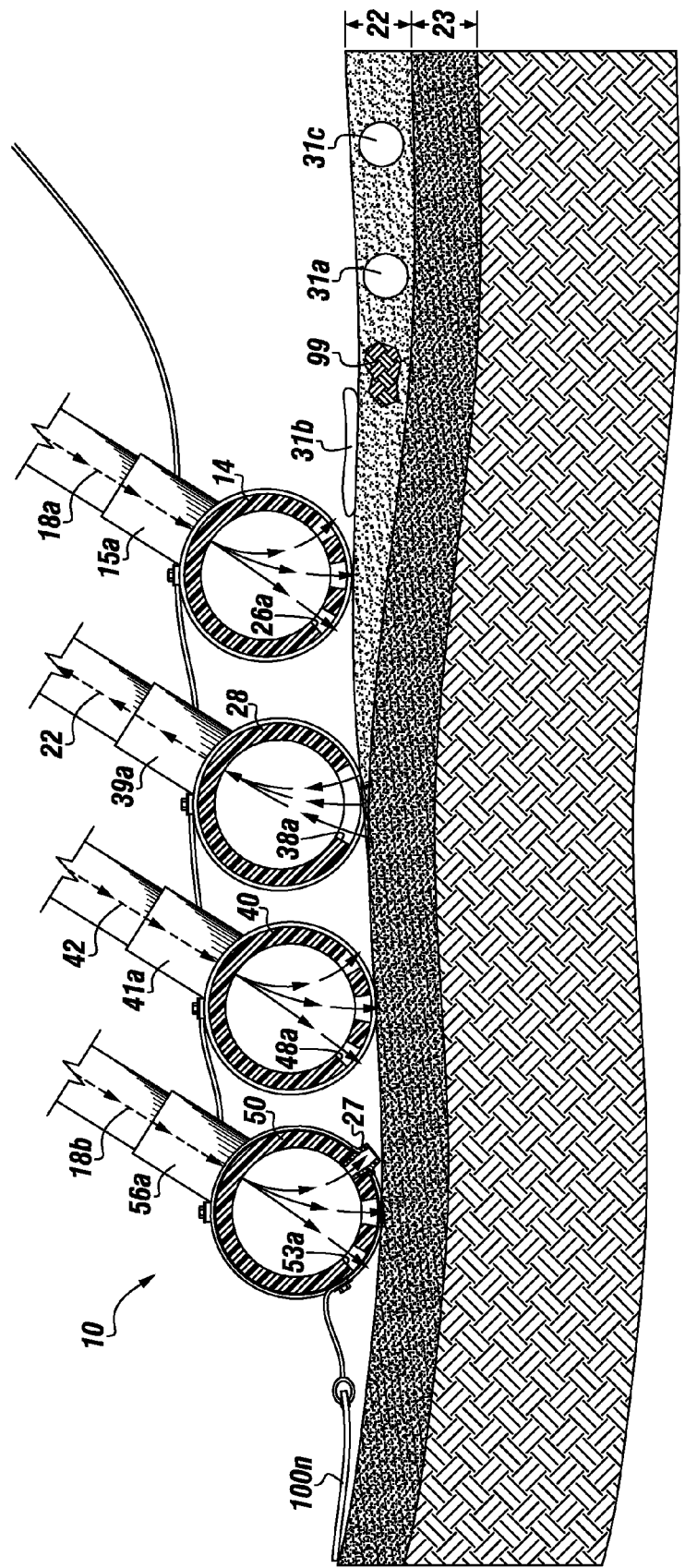
FIG. 3 depicts another view of a boom that can be used to implement the method.

FIG. 3 depicts an embodiment of the agitating, sucking, microbe and expelling boom 10 disposed proximate a first layer of material 22 and a second layer of material 23.

The agitator tubular 14 can expel compressed air 18a proximate the first layer of material 22 through agitator openings, such as agitator opening 26a. The compressed air 18a can flow through the agitator inlet 15a to the agitator openings. The agitator tubular 14 can stir up sand, particulate and oil within the first layer of material, which can include tar balls 31a, oil 31b, oil globules 31c, and rocks 99.

The sucker tubular 28 can suck-up the first layer of material 22 that has been agitated by the agitator tubular 14 through the sucker openings, such as sucker opening 38a. The sucker tubular 28 can expose the second layer of material 23. The first layer of material 22 can flow through the sucker inlet 39a from the sucker openings.

The microbe tubular 40 can expel microbes 42 proximate the second layer of material 23 through the microbe openings, such as microbe opening 48a. The microbes 42 can flow through the microbe inlet 41a to the microbe openings.

The expelling air tubular 50 can expel compressed air 18b proximate the second layer of material 23 through the expelling air openings, such as expelling air opening 53a. The expelling air tubular 50 is depicted with a nozzle 27 disposed in one of the plurality of openings of the expelling air tubular. The compressed air 18b can flow through the expelling air inlet 56a to the expelling air openings. Also depicted is a smoother 100n.

Figure 4:
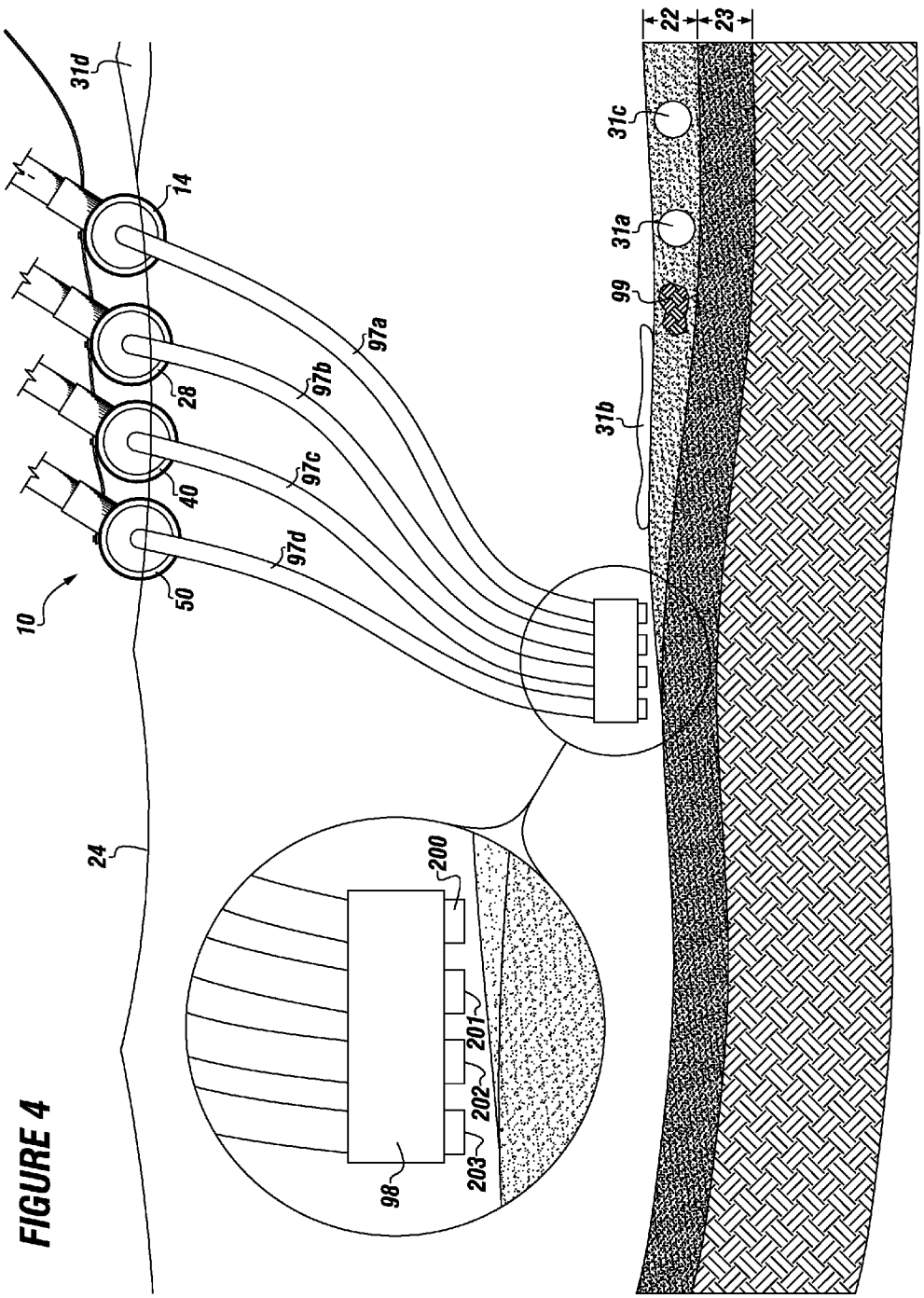
FIG. 4 depicts another embodiment of a system that can be used to implement the method.

FIG. 4 shows an embodiment wherein the agitating, sucking, microbe and expelling boom 10 is floating on a surface 24 of the body of water. An oil sheen 31d is also shown on the surface 24 of the body of water. Also depicted are tar balls 31a, oil 31b, oil globules 31c, and rocks 99.

Each tubular of the agitating, sucking, microbe and expelling boom 10 can have a flexible hose 97a, 97b, 97c, and 97d connected thereto. Each flexible hose can be connected to a distribution manifold 98, and can be in fluid communication with the distribution manifold. The distribution manifold 98 can be weighted such that it resides on or proximate the bed of the body of water. The combination of the agitating, sucking, microbe and expelling boom 10, the flexible hoses 97a-97d, and the distribution manifold 98 is also herein referred to as an ASME conduit.

The distribution manifold 98 can have an ASME agitating outlet 200 in fluid communication with the agitator tubular 14 through the flexible hose 97a for receiving compressed air from the compressed air source and flowing the compressed air proximate a first layer of material 22 on the bed of the body of water to agitate the first layer of material.

The distribution manifold 98 can have an ASME sucker inlet 201 in fluid communication with the sucker tubular 28 through the flexible hose 97b for receiving a vacuum pressure from the vacuum pump to suck the first layer of material 22 into the ASME sucker inlet and flow the first layer of material to the separator.

The distribution manifold 98 can have an ASME microbe outlet 202 in fluid communication with the microbe tubular 40 through the flexible hose 97c for flowing the plurality of microbes out of the ASME microbe outlet proximate the second layer of material 23.

The distribution manifold 98 can have an ASME expelling air outlet 203 in fluid communication with the expelling air tubular 50 through the flexible hose 97d for receiving compressed air from the compressed air source and flowing the compressed air out of the ASME expelling air outlet proximate the second layer of material 23 to provide oxygen to at least a portion of the body of water.

FIG. 5A depicts an embodiment of a method for removing hydrocarbon liquids and hydrocarbon associated particulates from a body of water using an agitating, sucking, microbe and expelling boom, also herein referred to as a boom.

The method can include attaching a boom to a floating vessel, as illustrated by box 500.

The method can include disposing the boom in a body of water, as illustrated by box 502.

The method can include flowing compressed air into an agitator tubular of the boom to agitate a first layer of material on the bed of the body of water, as illustrated by box 504.

The method can include providing a vacuum pressure to a sucker tubular of the boom to suck-up the first layer of material and to flow the first layer of material to a separator, as illustrated by box 506.

The method can include separating hydrocarbon liquid and hydrocarbon associated particulate from the first layer of material, forming a separated hydrocarbon liquid and hydrocarbon associated particulate and a separated water, and exposing a second layer of material on the bed of the body of water, as illustrated by box 508.

The method can include flowing a plurality of microbes proximate the second layer of material, as illustrated by box 510.

The method can include flowing compressed air through an expelling air tubular of the boom proximate the second layer of material to provide oxygen to at least a portion of the body of water, as illustrated by box 512.

The method can include smoothing the second layer of material, as illustrated by box 514.

The method can include storing the separated hydrocarbon liquid and the hydrocarbon associated particulate, as illustrated by box 516.

The method can include flowing the separated water to the body of water, as illustrated by box 518.

The method can include sinking the boom until the boom is disposed proximate to the bed of the body of water by disposing at least one weight on each tubular of the boom, as illustrated by box 520.

The method can include perforating the expelling air tubular on all sides to provide oxygen to the body of water, as illustrated by box 522.

The method can include providing the oxygen to the body of water until the body of water has an oxygen level equivalent the an oxygen level present before exposure of the hydrocarbon liquid and hydrocarbon associated particulate to the body of water, as illustrated by box 524.

Figure 5B:
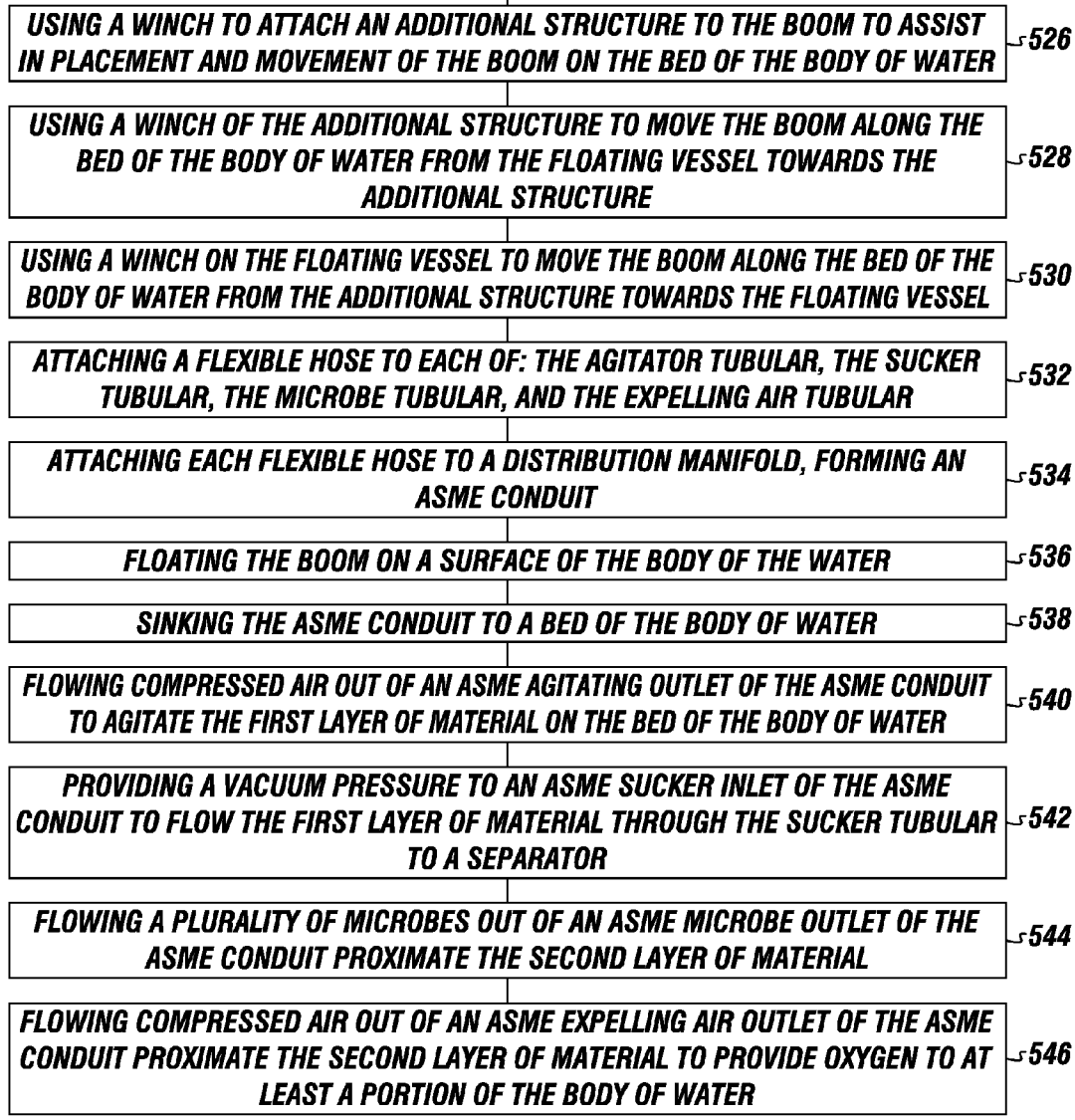
FIG. 5B is a continuation of FIG. 5A.

FIG. 5B is a continuation of FIG. 5A. The method can include using a winch to attach an additional structure to the boom to assist in placement and movement of the boom on the bed of the body of water, as illustrated by box 526.

The method can including using a winch of the additional structure to move the boom along the bed of the body of water from the floating vessel towards the additional structure, as illustrated by box 528.

The method can include using a winch on the floating vessel to move the boom along the bed of the body of water from the additional structure towards the floating vessel, as illustrated by box 530.

The method can include attaching a flexible hose to each of: the agitator tubular, the sucker tubular, the microbe tubular, and the expelling air tubular, as illustrated by box 532.

The method can include attaching each flexible hose to a distribution manifold, forming an ASME conduit, as illustrated by box 534.

The method can include floating the boom on a surface of the body of the water, as illustrated by box 536.

The method can include sinking the ASME conduit to a bed of the body of water, as illustrated by box 538.

The method can include flowing compressed air out of an ASME agitating outlet of the ASME conduit to agitate the first layer of material on the bed of the body of water, as illustrated by box 540.

The method can include providing a vacuum pressure to an ASME sucker inlet of the ASME conduit to flow the first layer of material through the sucker tubular to a separator, as illustrated by box 542.

The method can include flowing a plurality of microbes out of an ASME microbe outlet of the ASME conduit proximate the second layer of material, as illustrated by box 544.

The method can include flowing compressed air out of an ASME expelling air outlet of the ASME conduit proximate the second layer of material to provide oxygen to at least a portion of the body of water, as illustrated by box 546.

While these embodiments have been described with emphasis on the embodiments, it should be understood that within the scope of the appended claims, the embodiments might be practiced other than as specifically described herein.

What is claimed is:

1. A method for removing hydrocarbon liquid and hydrocarbon associated particulate from a body of water using an agitating sucking microbe and expelling boom, the method comprising:
   a. attaching an agitating sucking microbe and expelling boom to a floating vessel, wherein the agitating sucking microbe and expelling boom comprises an agitator tubular with agitator openings, a sucker tubular with sucker openings, a microbe tubular with microbe openings, and an expelling air tubular with expelling air openings;
   b. disposing the agitating sucking microbe and expelling boom in the body of water;
   c. flowing compressed air into the agitator tubular and out of the agitator openings to agitate a first layer of material on a bed of the body of water;
   d. providing a vacuum pressure to the sucker tubular to draw the first layer of material into the sucker openings and to flow the first layer of material through the sucker tubular to a separator;
   e. separating the hydrocarbon liquid and hydrocarbon associated particulate from the first layer of material using the separator, forming a separated hydrocarbon liquid and hydrocarbon associated particulate and a separated water, and exposing a second layer of material on the bed of the body of water;
   f. flowing a plurality of microbes into the microbe tubular and out of the microbe openings proximate the second layer of material; and
   g. flowing compressed air into the expelling air tubular and out of the expelling air openings proximate the second layer of material to provide oxygen to at least a portion of the body of water.

2. The method of claim 1, further comprising smoothing the second layer of material using a plurality of sand smoothers connected to the expelling air tubular.

3. The method of claim 1, further comprising attaching the agitating sucking microbe and expelling boom to at least two movable poles disposed on the floating vessel by using at least two guidelines.

4. The method of claim 3, further comprising attaching each guideline to a winch disposed on the floating vessel.

5. The method of claim 1, further comprising flowing the compressed air from a compressed air source disposed on the floating vessel.

6. The method of claim 1, further comprising providing the vacuum pressure using a vacuum pump disposed on the floating vessel.

7. The method of claim 1, further comprising pumping the plurality of microbes to the microbe tubular from a microbe reservoir using a microbe pump, wherein the microbe reservoir and the microbe pump are in fluid communication with the microbe tubular.

8. The method of claim 1, further comprising storing the separated hydrocarbon liquid and hydrocarbon associated particulate in a storage tank disposed on the floating vessel, wherein the storage tank is in fluid communication with the separator.

9. The method of claim 1, further comprising flowing the separated water from the separator to the body of water through a water conduit in fluid communication with the separator.

10. The method of claim 1, further comprising sinking the agitating sucking microbe and expelling boom until the agitating sucking microbe and expelling boom is disposed proximate to the bed of the body of water by disposing of at least one weight on each tubular.

11. The method of claim 1, wherein the floating vessel comprises: a shrimp boat, a bass boat, an airboat, a barge, a self propelled barge, a workboat, a shallow draft houseboat, a swing keel sailboat, a tugboat, a patrol boat, or another type of boat.

12. The method of claim 1, wherein the first layer of material comprises: a tar ball, an oil, an oil sheen, an oil plume, an oil globule, a copper tailing, a particulate, sand, a rock, a plant, dead organic matter, or combinations thereof.

13. The method of claim 1, further comprising:
   a. perforating the expelling air tubular on all sides to provide oxygen to the body of water; and
   b. providing the oxygen to the body of water until the body of water has an oxygen level equivalent to the oxygen level that was present before exposure of the hydrocarbon liquid and hydrocarbon associated particulate to the body of water.

14. The method of claim 1, further comprising connecting the agitator tubular to the sucker tubular, connecting the sucker tubular to the microbe tubular, and connecting the microbe tubular to the expelling air tubular, thereby forming a connected unit.

15. The method of claim 1, further comprising:
   a. attaching at least two additional guidelines to an additional floating vessel winch disposed on an additional floating vessel;
   b. attaching the at least two additional guidelines to the agitating sucking microbe and expelling boom; and
   c. moving the agitating sucking microbe and expelling boom on the bed of the body of water using the additional floating vessel winch.

16. The method of claim 1, further comprising:
   a. attaching at least two land based guidelines to a land based winch disposed on a land based structure;
   b. attaching the at least two land based guidelines to the agitating sucking microbe and expelling boom; and
   c. moving the agitating sucking microbe and expelling boom on the bed of the body of water using the land based winch.

17. A method for removing hydrocarbon liquid and hydrocarbon associated particulate from a body of water using an agitating sucking microbe and expelling boom, wherein the method comprises:
   a. attaching the agitating sucking microbe and expelling boom to a floating vessel, wherein the agitating sucking microbe and expelling boom comprises:
      (i) an agitator tubular comprising a plurality of agitator openings;
      (ii) a sucker tubular comprising a plurality of sucker openings;
      (iii) a microbe tubular comprising a plurality of microbe openings; and
      (iv) an expelling air tubular comprising a plurality of expelling air openings;
   b. disposing the agitating sucking microbe and expelling boom in the body of water;
   c. agitating a first layer of material on a bed of the body of water by flowing compressed air through the plurality of agitator openings from a compressed air source in fluid communication with the agitator tubular;
   d. exposing a second layer of material on the bed of the body of water by: providing a vacuum pressure to the sucker tubular using a vacuum pump in fluid communication with the sucker tubular, and using the vacuum pressure to draw the first layer of material through the plurality of sucker openings and through the sucker tubular;
   e. flowing the first layer of material from the sucker tubular to a separator in fluid communication with the sucker tubular;
   f. separating the hydrocarbon liquid and hydrocarbon associated particulate from the first layer of material using the separator, forming a separated water and a separated hydrocarbon liquid and hydrocarbon associated particulate;
   g. flowing a plurality of microbes from a microbe reservoir and out of the plurality of microbe openings proximate the second layer of material, wherein the microbe reservoir is in fluid communication with the microbe tubular; and
   h. re-oxygenating at least a portion of the body of water by flowing compressed air out of the plurality of expelling air openings proximate the second layer of material, wherein the compressed air source is in fluid communication with the expelling air tubular.

18. The method of claim 17, further comprising smoothing the second layer of material using a plurality of sand smoothers connected to the expelling air tubular.

19. The method of claim 17, further comprising:
   a. flowing the separated hydrocarbon liquid and hydrocarbon associated particulate from the separator to a storage tank in fluid communication with the separator; and
   b. flowing the separated water from the separator, through a conduit in fluid communication with the separator, and into the body of water.

20. A method for removing hydrocarbon liquid and hydrocarbon associated particulate from a body of water using an agitating sucking microbe and expelling boom, the method comprising:
   a. attaching the agitating sucking microbe and expelling boom to a floating vessel, wherein the agitating sucking microbe and expelling boom comprises an agitator tubular with agitator openings, a sucker tubular with sucker openings, a microbe tubular with microbe openings, and an expelling air tubular with expelling air openings;
   b. attaching a first end of a first flexible hose to the agitator tubular, wherein the first flexible hose is in fluid communication with the agitator tubular;
   c. attaching a first end of a second flexible hose to the sucker tubular, wherein the second flexible hose is in fluid communication with the sucker tubular;
   d. attaching a first end of a third flexible hose to the microbe tubular, wherein the third flexible hose is in fluid communication with the microbe tubular;
   e. attaching a first end of a fourth flexible hose to the expelling air tubular, wherein the fourth flexible hose is in fluid communication with the expelling air tubular;
   f. attaching a second end of each flexible hose to a distribution manifold, forming an ASME conduit, wherein the ASME conduit comprises:
      (i) an ASME agitating outlet in fluid communication with the agitator tubular;
      (ii) an ASME sucker inlet in fluid communication with the sucker tubular;
      (iii) an ASME microbe outlet in fluid communication with the microbe tubular; and
      (iv) an ASME expelling air outlet in fluid communication with the expelling air tubular;
   g. floating the agitating sucking microbe and expelling boom on a surface of the body of the water;
   h. sinking the ASME conduit to a bed of the body of water;

i. flowing compressed air into the agitator tubular and out of the ASME agitating outlet to agitate a first layer of material on the bed of the body of water;
j. providing a vacuum pressure to the sucker tubular to draw the first layer of material into the ASME sucker inlet and to flow the first layer of material through the sucker tubular to a separator;
k. separating hydrocarbon liquid and hydrocarbon associated particulate from the first layer of material using the separator, forming a separated hydrocarbon liquid and hydrocarbon associated particulate and a separated water, and exposing a second layer of material on the bed of the body of water;
l. flowing a plurality of microbes out of the ASME microbe outlet proximate the second layer of material; and
m. flowing compressed air out of the ASME expelling air outlet proximate the second layer of material to provide oxygen to at least a portion of the body of water.

* * * * *